3,247,259
PRIMARY-TERTIARY BISPEROXIDES

Richard A. Bafford, Delmont, Pa., assignor to W. R. Grace & Co., New York, N.Y., a corporation of Connecticut
No Drawing. Filed Sept. 9, 1963, Ser. No. 307,334
4 Claims. (Cl. 260—610)

This application is a continuation-in-part of my co-pending application Serial No. 40,185, filed July 1, 1960, now abandoned.

This invention relates to the synthesis of a novel class of bisperoxides. More particularly this invention recites a novel class of primary-tertiary bisperoxides.

The novel primary-tertiary bisperoxides of the instant invention have the general formula:

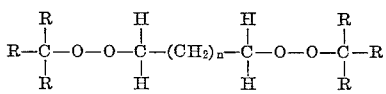

wherein $n$ is 0 to 8, and R is an alkyl or aryl group.

The novel primary-tertiary bisperoxides of the present invention are prepared by condensation of a primary dihaloalkane with a tertiary hyproperoxide in the presence of a base.

Recent art teaches the preparation of primary-tertiary diperoxides of the general formula:

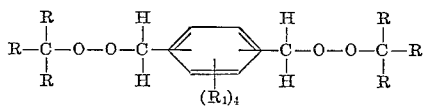

wherein R and $R_1$ represent the same or different hydrocarbyl radicals, which comprises reacting a hydroperoxide and a bis-(halomethyl)-tertrahydrocarbyl substituted benzene in the presence of a base. See U.S. 2,813,127. These aforementioned latter diperoxides have many drawbacks, however, that affect their commercial development. For example, these diperoxides are rapidly decomposed by strong bases. See 2,813,127, column 3, lines 5–12, and 59–50, and also Organic Peroxides, A. V. Tobolsky and R. B. Mesrobian, page 122, Interscience Publishers, Inc., New York, N.Y., 1954. Because of said base decomposition these diperoxides give poor yields on synthesis and great care must be taken to maintain pH control. Furtermore, to avoid the base-catalyzed decomposition of the resulting diperoxide product, it is necessary to have blocking alkyl groups ortho to the primary group. By blocking alkyl groups is meant a crowding of alkyl groups about the benzylic hydrogens to hinder abstraction of said hydrogens by a base.

Surprisingly, it has been found that the resulting bisperoxides of the instant invention are completely stable in the presence of strong bases, e.g. NaOH, KOH, etc. as contrasted to the aromatic primary tertiary diperoxides aforementioned. This relative stability is believed due to the absence of a benzylic hydrogen, the presence of which makes the diperoxide susceptible to base-catalyzed decomposition. Since no normal base will extract a hydrogen from an aliphatic methylene group, pH control is no problem. In light of this, the bisperoxides of the instant invention have the advantage over the aforesaid prior art of being readily and easily prepared in a variable pH range (e.g., pH equals 9 up to concentrated caustic solution, e.g. 10% caustic solution) without loss of yield due to base-catalyzed decomposition.

The insensitiveness of the bisperoxides of the present invention to base-catalyzed decomposition is important in rubber curing wherein the bisperoxides are admixed with compounds such as carbon blacks which range from acidic to basic.

The novel bisperoxides of this invention can be used as a catalyst in the polymerization of vinyl monomers, curing agent for rubber and as a crosslinking agent for polyethylene as will be more fully described hereinafter.

Summarily, primary-tertiary bisperoxides of the formula:

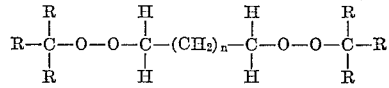

are produced in accordance with the instant invention by reacting in the presence of a base, a mole of a primary dihaloalkane of the formula:

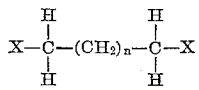

with at least two moles of a tertiary hydroperoxide of the formula:

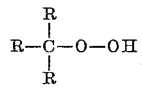

wherein all of the aforementioned formulas, R is an alkyl or aryl, $n$ is 0 to 8, and X is a member of the halogen group consisting of Br, Cl and I.

The reaction is carried out at temperatures in the range 0 to 80° C. at atmospheric pressure. The temperature of the reaction is governed and limited by the thermal decomposition of the resulting bisperoxide product.

The reaction is preferably performed in the presence of an inert solvent. Alcohol solvents are preferred due to the insolubility of the formed by-product alkali metal salts therein. However, a water solvent is equally suitable. Lower alcohols which contain not more than 5 carbon atoms and have a boiling point below 125° C. are preferred inert solvents and include methyl alcohol, ethyl alcohol, isopropyl alcohol, propyl alcohol, isobutyl alcohol, pentanol-2, pentanol-3 and butyl alcohol.

Various α,ω-dihaloalkanes are operable in the instant invention. Such dihaloalkanes are well known in the art and include:

1,2-dibromoethane
1,4-dibromobutane
1,8-dibromooctane
1,10-dichlorodecane
1,12-dichlorododecane
1,6-diiodohexane It should be mentioned that Br containing dihaloalkanes are preferred to Cl or I containing dihaloalkanes. This is due to the fact that alkyl bromides have a faster reaction rate than alkyl chlorides. Alkyl iodides are operable and have the fastest reaction rate of the group but yields are lower due to the reaction of the iodide ion formed with bisperoxide product.

The tertiary hydroperoxides of the formula:

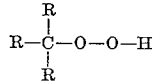

wherein R is an alkyl or aryl are prepared by methods well known in the art, e.g. oxidation of branched hydrocarbons. Tertiary hydroperoxides which are operable as a reactant herein include t-butyl hydroperoxide, cumyl hydroperoxide, diisopropylbenzene hydroperoxide, menthane hydroperoxide, p,t-butyl cumene hydroperoxide, Decalin hydroperoxide, triphenylmethyl hydroperoxide, etc.

The bases preferably employed in the instant invention are those which react readily with the hydrogen halide available from the reaction of the dihaloalkane and the tertiary hydroperoxide, but react if at all, only to a minimum extent with the dihaloalkane reactant. Bases usuable as a reactant in this invention include NaOH, KOH, LiOH, (CH$_3$)$_4$NOH, NaOC$_2$H$_5$, etc.

The amount of base employed is an equivalent amount sufficient to react with the hydrogen halide available from the reaction of the dihaloalkane and the hydroperoxide. For example in the reaction:

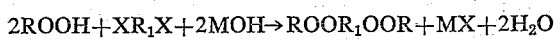

wherein R is an alkyl or aryl group, R$_1$ is an alkylene group, X is a member of the halogen group consisting of Br, Cl and I, and M is an operable member of the group consisting of alkali metals and alkaline earth metals, it is not known for certain if free hydrogen halide, HX, is ever formed and thereafter reacts with the base as in (a)

(a)

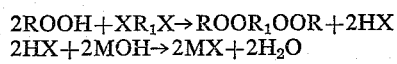

or, if the base reacts some other way, e.g. as in step (b)

(b)

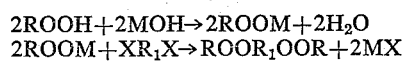

However, to the extent that HX is theoretically available as a reaction product at least sufficient base is added to react therewith.

The following examples will more clearly illustrate the instant invention, but are not to be deemed as limiting its scope.

EXAMPLE 1

To a 500 ml., 3 necked, round bottom flask containing 0.2 mole sodium hydroxide in 100 ml. of absolute ethanol and equipped with stirrer, dropping funnel and thermometer was added 25.7 (0.2 mole) of 70% commerial t-butyl hydroperoxide

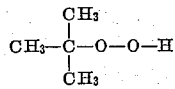

while maintaining the flask at 0° C. with an ice bath. To this cold solution was added 25 g. (0.08 mole) decamethylene dibromide also known as 1,10-dibromodecane,

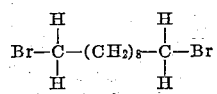

After four hours with stirring at room temperature sodium bromide began to precipitate. After 16 hours at which time no further precipitation was noted, the reaction was discontinued. The reaction mixture was filtered free of sodium bromide, concentrated in vacuo and taken up in ether. The ethereal solution was washed with 10% sodium hydroxide solution to remove any unreacted hydroperoxide followed by a water wash. The organic layer was separated, dried over magnesium sulfate and concentrated in vacuo. The colorless oily product weighed 22 g. (86% yield) and was analyzed 74.8% pure 1,10-bis(t-butylperoxy) decane,

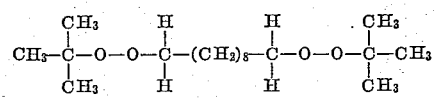

EXAMPLE 2

To a 500 ml., 3 necked, round bottom flask containing 11 g. (42 millimoles) sodium salt of cumene hydroperoxide in 250 ml.

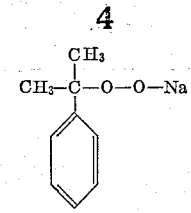

isopropanol and equipped with stirrer, dropping funnel and thermometer, was added 6 g. decamethylene dibromide. The mixture was heated to 50° C. whereat an exothermic reaction raising the temperature to about 70° C. took place. After about 20 minutes the temperature returned to about 50° C. and the reaction was continued with stirring. After 16 hours when no further sodium bromide precipitation was noted, the reaction was discontinued. The reaction mixture was filtered free of sodium bromide and worked up as in Example 1. The resultant oily 1,10-bis(cumylperoxy) decane product

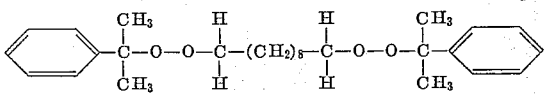

weighed 5 g.

EXAMPLE 3

To a 500 ml., 3 necked, round bottom flask containing 0.17 mole sodium hydroxide in 100 ml. of ethanol and equipped with stirrer, dropping funnel and thermometer, was added 17 g. of 90% t-butyl hydroperoxide. 18.4 g. (0.08 mole) 1,5-dibromopentane

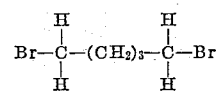

were added to the flask and the reaction proceeded with stirring at room temperature for 30 hours. The reaction mixture was filtered free of sodium bromide, concentrated in vacuo at room temperature and taken up in ether. The ethereal solution was washed with 10% sodium hydroxide solution to remove any unreacted hydroperoxide, followed by a water wash. The washed solution was further washed with a dilute sulfuric acid solution (5%), followed by an additional water wash. The organic layer was separated from the water layer, dried over magnesium sulfate and concentrated in vacuo. The product residue was heated to 40° C. under high vacuum in order to remove residual solvent. The 1,5-bis(t-butylperoxy) pentane product weighed 16.9 g. and had a boiling point of 65–69° C. at 0.2 mm. Hg pressure.

EXAMPLE 4

Using the equipment of Example 1, 21.6 g. (0.1 mole) 1,4-dibromobutane

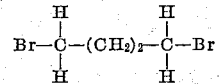

and 20 g. of 90% t-butyl hydroperoxide were added to a flask containing 0.20 mole sodium hydroxide in 84 ml. of ethanol. The reaction was carried on for 24 hours at room temperature. The reaction mixture was filtered free of sodium bromide, concentrated in vacuo and taken up in ether. The ethereal solution was washed with water followed by a wash with 10% NaOH solution. The solution was then washed with 5% H$_2$SO$_4$ followed by an additional water wash. The organic layer of the thus-washed solution was separated, dried over magnesium sulfate and concentrated in vacuo. The 1,4-bis(t-butylperoxy) butane product weighed 11.1 g. and had a boiling point of 49–52° C. at 0.3 mm. Hg.

EXAMPLE 5

10 g. (0.44 mole) sodium was dissolved in 200 ml. of ethanol and cooled to room temperature in a 1 liter, 3-necked, round bottom flask equipped with stirrer, dropping funnel and thermometer. 76 g. (0.5 mole) cumyl hydroperoxide was added with stirring to the flask along with 100 ml. ethanol. The resulting solution was slowly added over a 1 hour period to 42 g. (0.2 mole) 1,4-dibromobutane in 100 ml. ethanol at 45–50° C. After 10 minutes sodium bromide started to precipitate. The reaction was continued with stirring for 2 hours. The ethanol solvent was removed under reduced pressure at a temperature below 50° C. The residual oil and solids dissolved in 100 ml. benzene were washed with 200 ml. of $H_2O$ at 0° C. followed by a wash of 200 ml. of cold dilute (10%) HCl. After an additional cold water wash, the organic layer was separated, dried, and benzene removed therefrom. The product, 1,4-bis (cumylperoxy) butane,

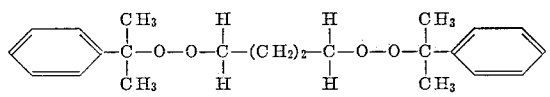

weighed 22.7 g. and was found to decompose above 100° C. at atmospheric pressure.

The bisperoxides of the instant invention are operable as crosslinking agents to improve physical properties of polyethylene.

When polyethylene is contacted with mobile polar liquids, intense embrittlement of the polymer with sudden cracking takes place within unduly short periods of time. Liquids such as acetone, lower alcohols, acetic acid and nitrobenzene, to name a few, have been known to cause this effect. The art has termed this phenomenon environmental stress cracking (ESC). See Polyethylene, Raff and Allison, page 263, Interscience Publishers Inc., New York, 1956.

The cause of environmental stress cracking in polyethylene is little understood to date. However, it is known that resistance to environmental stress cracking varies directly with the molecular weight of the polymer. Thus, methods to increase the polymer's molecular weight, such as crosslinking molecules in the polymer to thereby increase the weight average molecular weight of the molecules, in the polymer are being tested with varying success. The advent of high density polyethylene, see U.S. 2,816,883 having a melting point above 125° C. has initiated a problem in the crosslinking art. Although it is known that peroxides are crosslinking agents for polyethylene, it is difficult to find a peroxide crosslinking agent with a decomposition temperature high enough to allow decomposition to take place at or above the softening point of the polymer.

The bisperoxides herein disclosed are especially useful as crosslinking agents for high density polyethylene. The resultant crosslinked polymer with its increased molecular weight shows marked improvement in resisting environmental stress cracking.

One measurement used to indicate an increase in molecular weight is the melt index (MI). Melt index varies inversely with viscosity. Viscosity is a function of and varies with the molecular weight of the polymer. As the molecular weight of the polymer increases due to crosslinking the viscosity increases evidencing a decrease in melt index. Hence, a lower melt index after crosslinking shows that the molecular weight has been increased.

Throughout the instant invention the melt indices (MI) were measured under the conditions specified in ASTMD 1238–52T.

The densities of the polymer were measured in a density gradient tube by the Bell Laboratories Proposed ASTM Method for the Measurement of Density of Solid Plastics by the Density Gradient Technique.

The environmental stress-cracking data (ESC) was obtained using Igepal CO–630 (Antarox A–400) an alkylaryl polyethylene glycol produced by General Dyestuff Corp., in accordance with the Proposed Tentative Method of Test for Environmental Stress-Cracking of Type 1 Ethylene Plastics (ASTM Designation: D00159T) as disclosed in the 1959 preprint of the Report of Committee D–20 on Plastics, pp. 17–22 at the 62nd Annual Meeting of ASTM, June 21–26, 1959.

The clarity test devised specifically for evaluation of changes in the clarity of polyethylene due to crosslinking consists of viewing through a ½" diameter hole centered in a horizontal sample table holding clarity test samples thereon, a glowing filament from a 2-watt concentrated arc lamp (point light source) the extreme tip of said filament being situated 3 inches below the bottom surface of said test sample. The test samples are prepared by molding under 10,000 lbs. pressure at 350° F. and then air cooled to room temperature. The results of the clarity test are expressed in terms of the clarity number (mils) which is defined as the maximum thickness of the sample in mils through which the glowing filament, as viewed from 1 foot above the sample table, can still be observed.

In Examples 8–11, a Brabender Plastograph Model PL–V2 equipped with a recording unit for measuring changes in torque was used to admix the reactants and determine the degree of crosslinking. The aforesaid recording unit had a range of 0–1000 units equal to 0–1 kilogram-meter of torque. This range can be increased when necessary to 0–5000 i.e., equal to 0–5 kilogrammeters of torque by the addition of weights. However, other mechanisms, e.g. a Banbury mixer or a tape extruder, are equally operable.

The degree of crosslinking is related to the increase in torque ($\Delta \tau$) measured by the Plastograph recorder from the time the bisperoxide crosslinking agent is added to the fused polymer until the crosslinking reaction is discontinued. The greater the degree of crosslinking the greater the viscosity of the polyethylene which in turn requires a greater torque in order to drive the Plastograph at a constant r.p.m. The degree of crosslinking which can be accomplished by the instant invention is limited only by the ability of the mixing apparatus to overcome the torque caused by the crosslinking. Thus, polyethylene can be wholly crosslinked, if desired, under proper conditions and with proper equipment available.

A further check on the degree of crosslinking is the decrease in melt index due to crosslinking of the polyethylene. Since melt index varies inversely with viscosity which varies directly with degree of crosslinking, a lower melt index after crosslinking evidences that crosslinking occurred.

Unless otherwise noted, all parts and percentages are by weight in the following examples:

Examples 6 and 7 were performed in an extruder to show the possibility of using same to crosslink and shape the crosslinked polymer in a single operation.

EXAMPLE 6

2000 g. crude polyethylene (crumb form) having a density of 0.96 and a melt index of 5.0 were admixed with 5.0 g. 1,10-bis(t-butylperoxy); decane also known as 1,10-decamethylene d,t-butyl diperoxide and fed into the hopper of a National Rubber Machinery Laboratory Model Extruder (1" screw) over about a 40 minute period. The temperature in the extruder barrel was about 350° F. The extrudate from the die maintained at a temperature of 405° F. was in the form of a 0.180" diameter rod. The crosslinked extrudate was passed through a water bath (25° C.) and collected on a takeup roll. The thus-crosslinked polyethylene had a melt index of 0.03 as compared to 5.0 melt index for a control run of 0.96 density polyethylene per se which was not admixed with bisperoxide. A sample of the crosslinked polyethylene which was subjected to environmental stress cracking by the aforementioned Bell Laboratory Method endured for 24 hours. A control sample of 0.96 polyethylene per se having a melt index of 5.0 failed on bending in preparation for the environmental stress cracking test.

EXAMPLE 7

Using the equipment and procedure of Example 6 except that 1000 g. crude polyethylene having a density of 0.96 and a melt index of 2.5 were admixed with 0.6 g. 1,4-bis(cumylperoxy) butane resulted in a crosslinked polyethylene extrudate having a melt index of 0.83 and an ESC endurance of 26 to 41 hours. A control sample of identical polyethylene had an ESC endurance of 20 hours.

The following table shows the improvement in resistance to environmental stress cracking and improvement in clarity of polyethylene when crosslinked with other bisperoxides of the instant invention. The crosslinking step was performed in a Brabender Plastrograph.

TABLE I

| Exam No. | Run No. | Bisperoxide Additive (g.) | Polyethylene Feed | | | Plastrograph | | Crosslinked Polyethylene Prod. | | | Polyethylene Control [a] | | |
|---|---|---|---|---|---|---|---|---|---|---|---|---|---|
| | | | (Gms.) | Density g./cc. | Melt Index | Temp. °C. | | Melt Index | ESC (hrs.) | Clarity No. (mils) | Melt Index | ESC (hrs.) | Clarity No. (mils) |
| 8 | 486-3-339 | [b] 0.036 | 36.0 | 0.96 | 0.7 | | 550 | 0.102 | | | | | |
| 9 | 404-10-271 | [c] 0.025 | 36.0 | 0.96 | 0.7 | 197 | 210 | 0.223 | | | | 25-30 | |
| 10 | 404-25-293 | [d] 0.023 | 36.0 | 0.96 | 0.7 | | 410 | 0.071 | 49-112 | | 0.7 | | |
| 11 | 325-7-226 | [e] 0.020 | 38.0 | 0.96 | 0.7 | 169 | 200 | 0.062 | | 92 | | | 11-13 |

[a] Melt Index, ESC and Clarity Number Control data obtained on polyethylene (density, 0.96, MI, 0.7) which was not subjected to crosslinking.
[b] 1,4-bis(cumylperoxy) butane.
[c] 1,5-bis(t-butylperoxy) pentane.
[d] 1,4-bis(t-butylperoxy) butane.
[e] 1,10-bis(t-butylperoxy) decane.

What is claimed is:
1. A primary-tertiary bisperoxide of the formula:

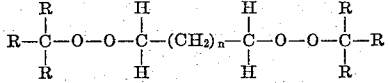

wherein R is a member of the group consisting of alkyl and aryl radicals and $n$ is 0 to 8.
2. 1,10-bis(t-butylperoxy) decane.
3. 1,4-bis(cumylperoxy) butane.
4. 1,10-bis(cumylperoxy) decane.

References Cited by the Examiner
UNITED STATES PATENTS
3,135,805   6/1964   Gilmont _____ 260—610

LEON ZITVER, *Primary Examiner.*
HAROLD G. MOORE, *Examiner.*